Dec. 10, 1963  F. D. LEADER ETAL  3,114,032
MEANS FOR CONTROLLING ON AND OFF PERIODS OF
WELDING EQUIPMENT IN REFACING
LINK TRACKS AND THE LIKE
Filed March 20, 1959  2 Sheets-Sheet 1
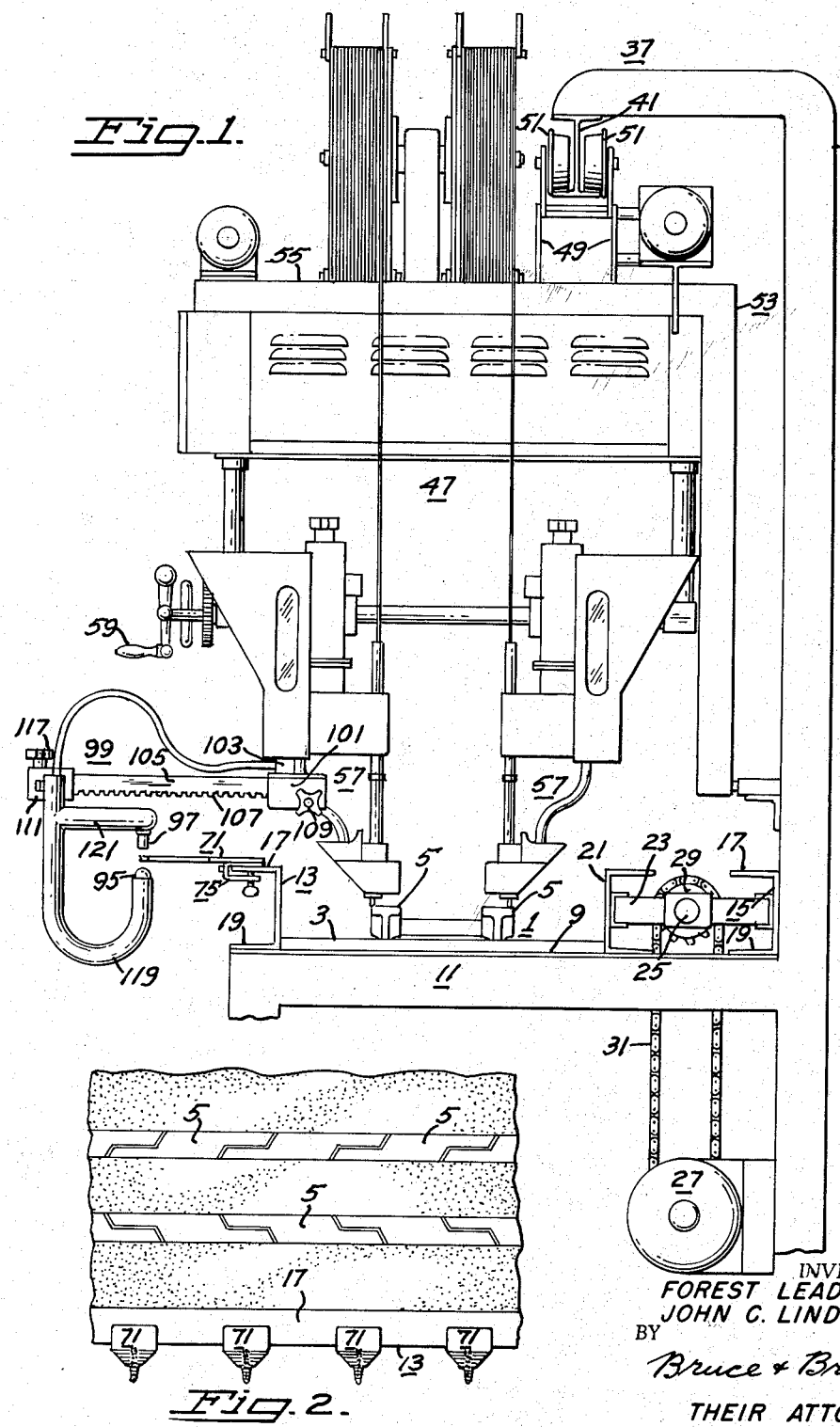
INVENTORS
FOREST LEADER
JOHN C. LINDGREN
BY
*Bruce & Broder*
THEIR ATTORNEYS Dec. 10, 1963    F. D. LEADER ETAL    3,114,032
MEANS FOR CONTROLLING ON AND OFF PERIODS OF
WELDING EQUIPMENT IN REFACING
LINK TRACKS AND THE LIKE
Filed March 20, 1959    2 Sheets-Sheet 2
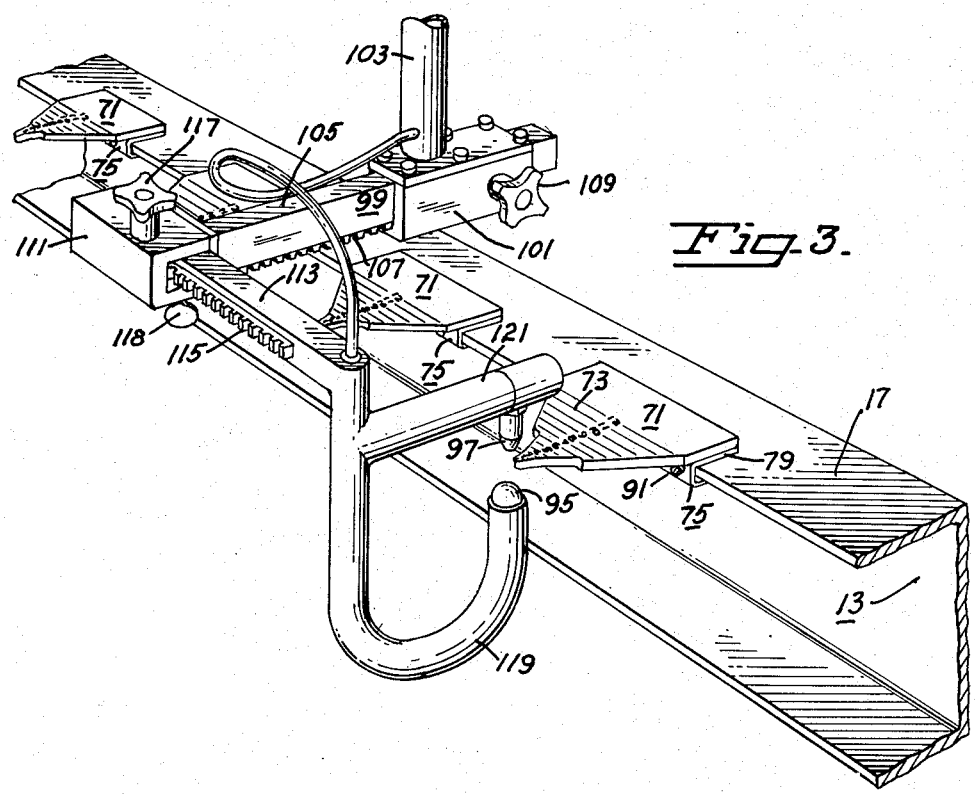
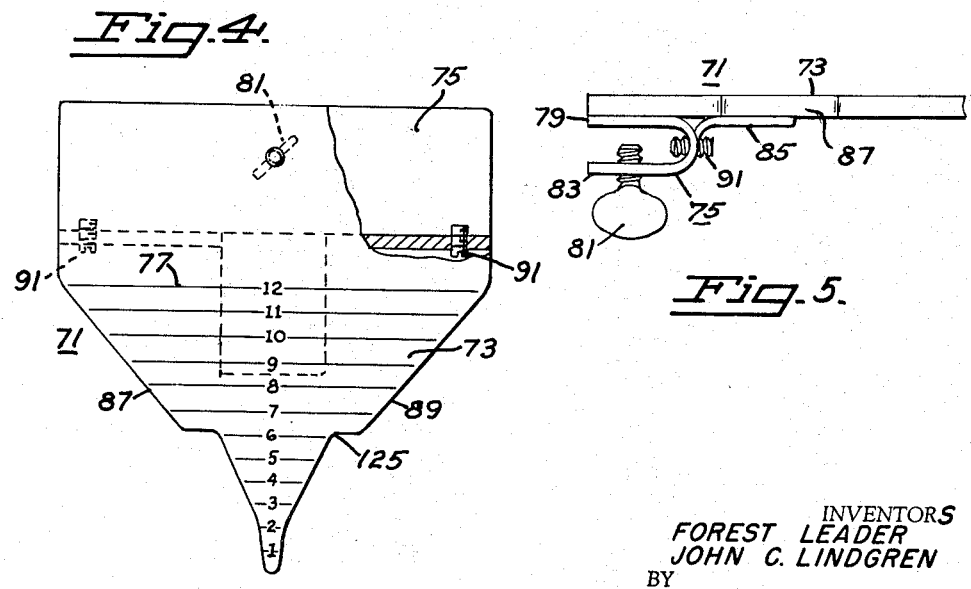
INVENTORS
FOREST LEADER
JOHN C. LINDGREN
BY
Bruce & Broeler
THEIR ATTORNEYS › # United States Patent Office 3,114,032
Patented Dec. 10, 1963

3,114,032
MEANS FOR CONTROLLING ON AND OFF PERIODS OF WELDING EQUIPMENT IN REFACING LINK TRACKS AND THE LIKE
Forest D. Leader, Oakland, and John C. Lindgren, Pinole, Calif., assignors to L & B Welding Equipment, Inc., Berkeley, Calif., a corporation of California
Filed Mar. 20, 1959, Ser. No. 800,693
1 Claim. (Cl. 219—125)

Our invention relates to welding equipment and more particularly to control means for determining on and off periods of welding equipment employed in the refacing of spaced aligned elements such as the links of a link track.

The present application embodies a simplification and modification of the control means involved in the apparatus forming the subject matter of the application of Turner G. Brashear, Jr. and Forest Leader for Link Track Refacing Apparatus, Serial No. 728,235, filed April 14, 1958, now Patent No. 3,019,328.

In accordance with the disclosure in such application, a pair of welding heads are caused to simultaneously travel along prescribed paths longitudinally of the two rows of link components involved in the construction of such a track, each welding head depositing metal along its associated row of components as it travels therealong. Following each such travel, the welding heads are each shifted to an adjacent path on its associated row of components, until the complete surface of each row of link components has been built up by the deposition of metal thereon.

During travel of the welding heads across the spaces between adjacent links, deposition of metal is to be avoided, and, accordingly, the arc during these brief periods should be extinguished. The links of a track, however, are so designed that the spacing between aligned components of such links is zig-zag in character and, consequently, the space distances between adjacent link components will vary materially for the various paths of travel of the welding head necessary to cover the entire surface of each link component.

In the aforementioned application, this was all taken care of automatically by providing a pattern strip duplicating the space areas between adjacent link components, such space areas being themselves spaced apart by distances equal to the length of each link component. In other words, the pattern strip practically duplicated the surface areas and spacings of the particular link track to be worked on.

In conjunction with such pattern strip, a light source and light responsive element mounted to either side of the pattern strip and carried by one of the welding heads, moved in accordance with movement of the welding heads and were employed to bring about an extinguishment of the arc as the light source traveled across any of the space area patterns of the pattern strip.

While the aforementioned method automatically took care of the wide variations in spacing between adjacent links for the different paths of travel of the welding heads along a row of such links, a special pattern strip had to be laid out for each track which differed from a preceding track as to comparable dimensions.

Among the objects of the present invention are:
(1) To provide novel and improved means for controlling on and off periods in welding equipment;
(2) To provide novel and improved means for controlling on and off periods of welding equipment employed in the refacing of link tracks and the like;
(3) To provide novel and improved means for controlling the on and off periods of welding equipment employed in the refacing of link tracks and the like, which control means is very flexible in its applications;
(4) To provide novel and improved pattern means for controlling on and off periods of welding equipment;
(5) To provide novel and improved pattern means for controlling the on and off periods of welding equipment employed in the refacing of link tracks, which pattern means is adapted to function despite wide variations in tracks to be serviced.

Additional objects of our invention will be brought out in the following description of a preferred embodiment of the same taken in conjunction with the accompanying drawings wherein, FIG. 1 is a front view in elevation of apparatus for the refacing of link tracks or the like and embodying therein the control means of the present invention;

FIG. 2 is a fragmentary plan view depicting the relationship between a control pattern involved in the present invention and a link track to be serviced;

FIG. 3 is a three dimensional view of the control means of the present invention and its manner of installation for use in controlling the on and off periods of operation of associated welding equipment;

FIG. 4 is a plan view, partly broken away, of the control pattern involved in the present invention; and FIG. 5 is a side edge view of the control pattern of FIG. 4.

Referring to the drawings for details of the present invention in its preferred form, the same has been disclosed in FIG. 1, installed in conjunction with welding equipment adapted to reface a link track 1 of the type involving a plurality of hingedly connected links, each of which comprises a ground engaging pad 3 affixed to a pair of spaced apart track components 5. These track components, at their ends, overlap adjacent aligned components of the track and ride the supporting rollers of a tractor (not illustrated), the overlapping of the track components serving to provide for a smooth transfer of load from one link to another of the track.

Such refacing apparatus comprises a link track supporting bed for laying out such track with the spaced apart components 5 facing upwardly, the track supporting bed including a bed plate 9 supported on a frame 11 which includes a fixed longitudinal beam 13 along the front edge of the bed plate and a fixed rear longitudinal beam 15 along the rear edge of the bed plate parallel to the front beam. Each of these beams is preferably of channel section and disposed with their flanges 17, 19 horizontal and facing frontwardly.

To assure that the track lies straight and parallel to the longitudinal axis of the bed when placed thereon, a pusher beam 21 disposed on the bed plate in substantial parallelism with the front and rear beams 13 and 15 respectively, is connected to the rear beam by a plurality of double toggles 23 having an adjusting screw 25 common to the same, such adjusting screw being in drive connection to a motor 27 mounted on the frame preferably below the adjusting screw and in drive connection thereto, utilizing for this purpose a sprocket 29 on the screw and a drive chain 31 from the motor to the sprocket.

Above the bed and running full length thereof is an overhead or elevated track assembly 37 including a plurality of brackets 39 affixed along the rear edge of the bed frame and terminating above the bed plate, and an I-beam monorail track 41 supported by said brackets.

Suspended from the elevated track is a welding assembly 47 adapted to move along the track for the entire length of the bed. This welding assembly includes a carriage comprising a truck 49 having suspension wheels 51 riding on the lower flanges of the track, and an inverted L-bracket 53 suspended from the truck with its horizontal arm 55 extending transversely of the link track bed plate, this inverted L-bracket serving as the mounting for all of the essential welding equipment involved in the refacing of a link track.

Such welding equipment involves a pair of welding head assemblies 57, each disposed for movement along one of the rows of track components, with provision for adjusting such welding head assemblies both vertically and laterally to position each with respect to the row of components over which it is to travel. The adjusting mechanism may correspond to that of the earlier mentioned application, which permits of lateral displacement of the welding heads in opposite directions, simultaneously by rotation of a handle 59, whereby in view of the oppositely directed space areas between the components of a link of such a track (FIG. 2) the welding heads will occupy corresponding positions over any link.

In accordance with the control means of the aforementioned application, once a pattern strip has been established for the particular track to be serviced, all that had to be done in operating such control system was to shift the welding heads to an adjacent path of travel at the beginning of the track, the pattern strip automatically determining the on and off periods of the welding heads as they each move from one link component across the intervening gap to the adjacent component, regardless of variations in such intervening space for the different paths to be travelled.

The present control system employs a plurality of individual control pattern assemblies 71 of like design and construction, each of which involves a pattern 73 of substantially triangular shape, such pattern being mounted on a clamp 75 for attachment to the upper flange 17 of the front beam 13 with the base line 77 of the pattern paralleling the path of travel of the welding heads.

The clamp 75 may be in the form of a trough fabricated from heavy gauge sheet metal, the pattern being affixed to one side wall 79 of the trough. A tightening screw 81 passing through the opposite wall 83 of the trough, is adapted to engage the underside of the mounting flange 17 after the pattern has been assembled thereon, whereby the pattern may be securely clamped to the flange.

A tab 85 punched out from the pattern side of the trough and bent over through an angle of 180 degrees to bring it back into the plane of that side, will function as added support for the pattern. The pattern thus may be fabricated from flexible material such as rubber or the like.

Across the surface of the pattern between the converging edges 87, 89 thereof, are preferably drawn a plurality of parallel lines including the base line 77, all of which will substantially parallel the paths of travel of the welding heads. These parallel lines may be assigned numbers or symbols indicative of the distances between the converging edges of the pattern, the range of distances being such as to encompass the maximum space travel between adjacent links of the link track which one is apt to encounter in tracks of various sources of manufacture.

To provide for adjustment of the pattern on the flange 17 of the front beam, so as to assure parallelism between the line markings thereon and the path of travel of the welding heads, a set screw 91 or comparable adjusting screw, passes through the bottom of the trough at each end thereof, such screws being adapted to engage the edge of the mounting flange 17 of the beam whereby such paralleling adjustments may be made prior to clamping the pattern to such flange.

A plurality of such pattern assemblies are attached to the mounting flange 17 of the front beam and spaced thereon in accordance with the distance between the space areas of the links of the track to be serviced. The patterns, when so installed, are adapted to trigger any type of conventional control circuit, which in turn functions to determine the on and off periods of the welding heads. One such type of conventional control circuit and one which has been employed in the system of the prior mentioned application, involved a light source 95 and a light responsive element 97.

In utilizing such a system in the present invention, a bracket 99 carried by one of the welding heads is adapted to carry the light source 95 in a plane to one side of the patterns and the light responsive element 97 in a plane to the other side of the patterns and in alignment with the light source.

Such bracket is designed and constructed to permit of longitudinal and transverse adjustment of the light source and light responsive element as a unit with respect to the patterns, and involves a horizontal sleeve 101 depending by means of a pipe 103 from one of the welding head assemblies. In this sleeve 101 there is slidably positioned a horizontal bracket arm 105 having on its under side a rack 107 which is engaged by a pinion mounted in the sleeve and controlled by a knob 109 externally thereof.

The horizontal bracket arm 105 carries at its free end, a similar sleeve 111 disposed longitudinally of the bed frame, and this latter sleeve slidably receives an arm 113 to one surface of which is affixed a rack 115 for engagement with a pinion supported within this sleeve and controlled externally thereof by a control knob 117.

A locking screw 118 through the bottom of sleeve 111 may be employed to lock the arm 113 in any adjusted position.

At the exposed end of this arm 113, are a pair of branch arms, one of which 119 carries the light source 95 in its proper plane, and the other of which 121 carries the light responsive source 97 in its proper plane. These branch arms may be of hollow construction to permit of threading wiring to electrically connect the light source and light responsive element into circuit in a convenient manner. In this connection, the pipe 103 may likewise be employed.

As thus supported, the light source and light responsive element must move with movement of the welding heads, and along the row of patterns, with the patterns intercepting the light beam to the light responsive element as the light source is carried across such patterns. The arc may thus be extinguished during such interruptions of the light beam, the period of interruption at each pattern being determined by the path traversed by the light source and light responsive element across such pattern.

In operating the control system of the present invention, the patterns are set up as previously indicated, in accordance with the distances between the space areas of the track to be serviced, care being taken to assure corresponding distance lines being in alignment, and with the welding heads each positioned at an appropriate point in the path to be traveled by it, such as at the "leaving" end of a link component, the distance across to the adjacent link component along such path to be traveled is then measured and the corresponding distance noted on the patterns. The position of the light source and the light responsive element may then be adjusted by the knob 109 to traverse the corresponding distance on the patterns, and by the knob 117 to arrive at each pattern coincident with the arrival of the welding heads at the ends of each of the link components, or expressed in other words, when the welding heads arrive at the gaps between the links.

While such adjustment of the light source and light responsive element must be made in preparation for each path of travel of the welding heads along their respective rows of link components, and is not automatically taken care of as in the control system of the previously referred to application, the present system is considerably more flexible and permits of the standardizing of the patterns to cover any known variation in available link tracks.

While the pattern has been described as being generally of triangular shape, the specific contour is not critical, nor whether the triangular shape conforms to a right triangle or to an equilateral or isosceles triangle. In fact, in the preferred form of the pattern, the converging sides of the triangular pattern may be offset inwardly at an intermediate point 125, causing a rather sharp change in the distances marked off across the pattern, this being permissible because, with the zig-zag hinge joint prevalent in practically all link tracks, such sharp change in the gap distance will be found to prevail.

While we have indicated the application of our control pattern to a light source control triggering system, it will be apparent that the basic pattern may be modified to control a triggering system mechanically instead of through the interruption of a light beam, and further that the location of the row of patterns is not limited to that illustrated and described in that the controlling factor is merely that they be disposed in a row paralleling the paths of movement of the welding heads. The bracket which carries the light source and light responsive element may thus be modified structurally and affixed to any point on the movable welding equipment to assure operation in the manner described.

Accordingly, while we have illustrated and described our invention in its preferred form, the same is subject to alteration and modification without departing from the underlying principles involved, and we accordingly do not desire to be limited in our protection to the specific details so illustrated and described, except as may be necessitated by the appended claim.

We claim:

Welding apparatus for performing work on a row of aligned work surfaces spaced from one another, comprising a welding head; track means substantially paralleling such row of aligned work surfaces and guiding such welding head along a path of movement over such surfaces; means for aligning said welding head with a path to be traveled over such row of aligned work surfaces; a plurality of control patterns, each comprising a substantially triangular pattern having converging edges, clamp means for adjustably mounting said pattern, said clamp means including a trough of U-section, to one side wall of which said pattern is affixed, a clamping screw in the opposite side wall thereof, and an adjusting set screw through the bottom of said trough at at least one end thereof; means disposed parallel to the path of movement of said welding head for the mounting of a plurality of said control patterns with their base lines paralleling said path of movement; and means responsive to movement of said welding head for controlling welding in accordance with said patterns and distribution thereof.

References Cited in the file of this patent

UNITED STATES PATENTS

| | | |
|---|---|---|
| 2,460,990 | Kratz | Feb. 8, 1949 |
| 2,602,869 | Peck et al. | July 8, 1952 |